(12) United States Patent
Zhou et al.

(10) Patent No.: US 11,870,359 B2
(45) Date of Patent: Jan. 9, 2024

(54) TRANSFORMER AND BIDIRECTIONAL ISOLATED RESONANT CONVERTER

(71) Applicant: Delta Electronics (Shanghai) Co., Ltd., Shanghai (CN)

(72) Inventors: Jinping Zhou, Shanghai (CN); Mingzhun Zhang, Shanghai (CN); Min Zhou, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 271 days.

(21) Appl. No.: 17/453,179

(22) Filed: Nov. 1, 2021

(65) Prior Publication Data

US 2022/0181986 A1    Jun. 9, 2022

(30) Foreign Application Priority Data

Dec. 4, 2020    (CN) .......................... 202011407028.9

(51) Int. Cl.
  *H02M 3/335*    (2006.01)
  *H01F 27/38*    (2006.01)
  *H01F 27/24*    (2006.01)
  *H01F 3/14*    (2006.01)

(52) U.S. Cl.
  CPC .......... *H02M 3/33584* (2013.01); *H01F 3/14* (2013.01); *H01F 27/24* (2013.01); *H01F 27/38* (2013.01)

(58) Field of Classification Search
  CPC ..... H02M 3/335; H02M 3/33584; H01F 3/14; H01F 27/24; H01F 27/28
  See application file for complete search history.

(56) References Cited

U.S. PATENT DOCUMENTS

| 11,482,938 | B2 * | 10/2022 | Lu ...................... H02M 3/33584 |
| 11,626,806 | B2 * | 4/2023 | Dong ................ H02M 3/33584 363/17 |
| 2023/0230747 | A1 * | 7/2023 | Hong .................... H01F 27/306 336/170 |
| 2023/0260692 | A1 * | 8/2023 | Gul ....................... H01F 27/306 336/220 |

FOREIGN PATENT DOCUMENTS

| CN | 206775390 U | 12/2017 |
| CN | 208571930 U | 3/2019 |
| CN | 110492754 A | 11/2019 |

\* cited by examiner

*Primary Examiner* — Adolf D Berhane
(74) *Attorney, Agent, or Firm* — CKC & Partners Co., LLC

(57) ABSTRACT

Embodiments of the present application provide a transformer and a bidirectional isolated resonant converter, where the transformer includes a first side winding, a second side winding, and a magnetic core. The magnetic core includes a winding column, at least one side column and two connecting portions. The first side winding includes: a first side first winding and a first side second winding that are electrically connected, and the second side winding is located between the first side first winding and the first side second winding. An air gap is provided on the winding column, and the air gap is provided between the second side winding and a first end surface of the winding column, and a first side equivalent leakage inductance and a second side equivalent leakage inductance are obtained through the air gap.

15 Claims, 10 Drawing Sheets

(a) (b) (c) (d)

TRANSFORMER AND BIDIRECTIONAL ISOLATED RESONANT CONVERTER

CROSS-REFERENCE TO RELATED APPLICATION

This application claims priority to Chinese Patent Application No. 202011407028.9 filed on Dec. 4, 2020, which is hereby incorporated by reference in its entirety.

TECHNICAL FIELD

Embodiments of the present application relate to the field of power supply technology, and in particular, to a transformer and a bidirectional isolated resonant converter.

BACKGROUND

In the bidirectional isolated converter, the CLLLC topology is a typical circuit scheme. FIG. 1a is a schematic circuit diagram of a bidirectional isolated resonant converter. The bidirectional isolated resonant converter includes a first side circuit 110, a second side circuit 120 and a resonant tank 130, where the resonant tank 130 is electrically coupled between the first side circuit 110 and the second side circuit 120. The resonant tank 130 includes a first side resonant capacitor Cr1, a second side resonant capacitor Cr2, three resonant inductors Lr1, Lr2 and Lm, and an isolation transformer Tx. The three resonant inductors are respectively a first side resonant inductor Lr1, a parallel resonant inductor Lm, and a second side resonant inductor Lr2.

Regarding implementation schemes of magnetic elements in the bidirectional isolated resonant converter, the first scheme is that the first side resonant inductor Lr1 and the second side resonant inductor Lr2 are respectively two independent magnetic elements, the transformer Tx and the parallel resonant inductor Lm are integrated together to form a magnetic element. The bidirectional isolated resonant converter adopting this scheme totally includes three independent magnetic elements. Due to the large number of magnetic elements, the size and loss of the magnetic elements are relatively large, so that the total volume and loss of the resonant converter are relatively large, and the cost is relatively high.

The second scheme is that the resonant inductors Lr1 and Lr2 and the transformer Tx share a part of the magnetic core to achieve partial integration of the magnetic core, as shown in FIG. 1b. Compared with the first scheme, the second scheme can reduce the overall size of the magnetic elements. However, in this scheme, the resonant inductors Lr1 and Lr2 and the transformer Tx only share part of the magnetic core, and the windings of the first side resonant inductor Lr1 and the second side resonant inductor Lr2 still need to be set separately, so that the overall integration of the magnetic elements is still not high, and the loss reduction effect is still not significant enough.

SUMMARY

The embodiments of the present application provide a transformer and a bidirectional isolated resonant converter.

In a first aspect, an embodiment of the present application provides a transformer including: a first side winding, a second side winding, and a magnetic core;

where the magnetic core includes: a winding column, at least one side column and two connecting portions; two ends of the winding column are respectively connected to the at least one side column through the two connecting portions;

the first side winding includes: a first side first winding and a first side second winding that are electrically connected;

the second side winding is located between the first side first winding and the first side second winding, and the second side winding and the first side first winding are spaced apart by a first preset distance along the axial direction of the winding column, and the second side winding and the first side second winding are spaced apart by a second preset distance along the axial direction of the winding column, the first side first winding, the first side second winding and second side winding are all wound around the winding column;

a first air gap is provided on the winding column, where the first air gap is provided between the second side winding and a first end surface of the winding column.

Optionally, the first air gap is used to obtain a first side equivalent leakage inductance and a second side equivalent leakage inductance, and the first side equivalent leakage inductance and the second side equivalent leakage inductance are used to achieve a first side resonant inductor and a second side resonant inductor of a bidirectional isolated resonant converter.

Optionally, the first air gap is provided between the second side winding and the first side first winding.

Optionally, a second air gap is further provided on the winding column, and the second air gap is provided between the second side winding and a second end surface of the winding column, where the second end surface of the winding column is provided opposite to the first end surface.

Optionally, the second air gap is provided between the second side winding and the first side second winding.

Optionally, the first side first winding and the first side second winding are symmetrically distributed with respect to the second side winding, the first air gap and the second air gap are symmetrically distributed with respect to the second side winding.

Optionally, the transformer further includes: a first auxiliary magnet and a second auxiliary magnet;

the first auxiliary magnet is provided between the first side first winding and the second side winding, and the second auxiliary magnet is provided between the first side second winding and the second side winding.

Optionally, the first auxiliary magnet and the second auxiliary magnet are both provided between the first air gap and the second air gap.

Optionally, both the first auxiliary magnet and the second auxiliary magnet are both magnet pieces with two ends in arc-shape.

Optionally, the first auxiliary magnet and the second auxiliary magnet are symmetrically distributed with respect to the second side winding.

Optionally, the first auxiliary magnet and the second auxiliary magnet are both discrete components, and the first auxiliary magnet and the second auxiliary magnet are fixed in a cavity of a winding bobbin.

Optionally, the first auxiliary magnet and the second auxiliary magnet are integrally formed with at least part of the winding column, respectively.

Optionally, a third air gap is provided on the winding column, and the third air gap is located between the first auxiliary magnet and the second auxiliary magnet.

Optionally, the at least one side column includes two side columns, and the winding column is located between the two side columns.

In a second aspect, an embodiment of the present application provides a bidirectional isolated resonant converter including: a first side circuit, a second side circuit and a resonant tank, where the resonant tank is electrically coupled between the first side circuit and the second side circuit;

the resonant tank includes a first side resonant capacitor, a second side resonant capacitor, and the transformer according to any item of the first aspect;

the transformer is electrically connected to the first side resonant capacitor and the second side resonant capacitor.

The embodiments of the present application provide a transformer and a bidirectional isolated resonant converter. In the transformer, an air gap is provided on a winding column, the air gap is provided between a second side winding and a first end surface of the winding column, a first side equivalent leakage inductance and a second side equivalent leakage inductance are obtained through the air gap, the first side equivalent leakage inductance and the second side equivalent leakage inductance are used to realize a first side resonant inductor and a second side resonant inductor of the bidirectional isolated resonant converter. There is no need to additionally provide a first side resonant inductor and a second side resonant inductor, thereby reducing the overall volume and loss of magnetic elements, which improves the integration of the bidirectional isolated resonant converter, thereby also reducing the volume and loss of the bidirectional isolated resonant converter.

BRIEF DESCRIPTION OF DRAWINGS

In order to explain technical solutions in embodiments of the present application or the prior art more clearly, the following will briefly introduce drawings needed in the description of the embodiments or the prior art. Obviously, the drawings in the following description are some embodiments of the present application. For those of ordinary skill in the art, other drawings can be obtained based on these drawings without creative labor.

FIG. 2b is a perspective view of the structure of the transformer in FIG. 2a;

FIG. 2c is a front view of the magnetic core of the transformer in FIG. 2a;

FIG. 2d is a perspective view of the magnetic core of the transformer in FIG. 2a;

FIG. 2e is an exploded view of the magnetic core of the transformer in FIG. 2a;

FIG. 7b is a perspective view of the structure of the transformer in FIG. 7a;

FIG. 7c is a perspective view of the magnetic core of the transformer in FIG. 7a;

FIG. 7d is an exploded view of the magnetic core of the transformer in FIG. 7a;

FIG. 8b is a front view of the magnetic core of the transformer in FIG. 8a;

FIG. 8c is a perspective view of the magnetic core of the transformer in FIG. 8a; and FIG. 8d is an exploded view of the magnetic core of the transformer in FIG. 8a.

DESCRIPTION OF EMBODIMENTS

In order to make the purpose, technical solutions and advantages of the embodiments of this application clearer, the technical solutions in the embodiments of this application will be described clearly and comprehensively in conjunction with the drawings in the embodiments of this application. Obviously, the described embodiments are part of the embodiments of the present application, rather than all of the embodiments. Based on the embodiments in this application, all other embodiments obtained by a person of ordinary skill in the art without creative work shall fall within the protection scope of this application.

Figure 2A:
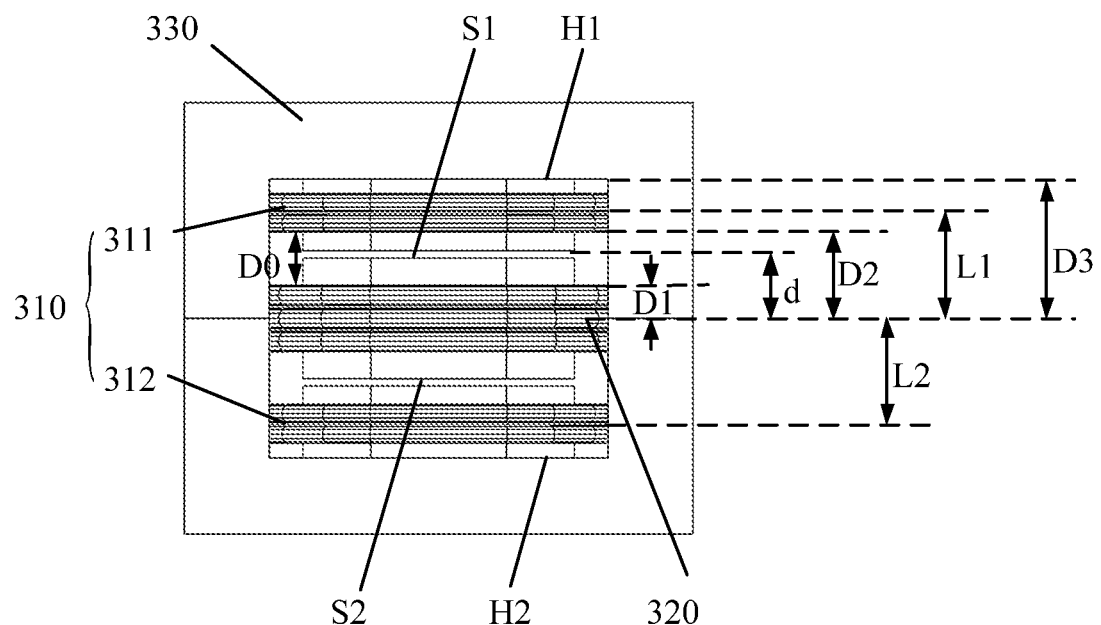
FIG. 2a is a schematic structural diagram of a transformer provided by an embodiment of the present application.
Figure 2B:
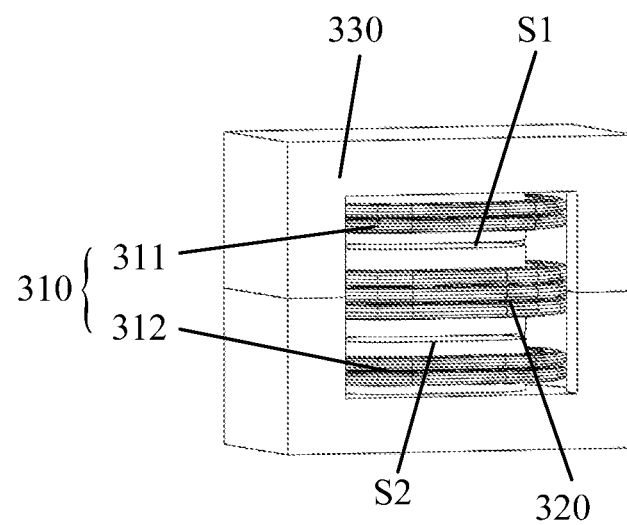
Figure 2C:
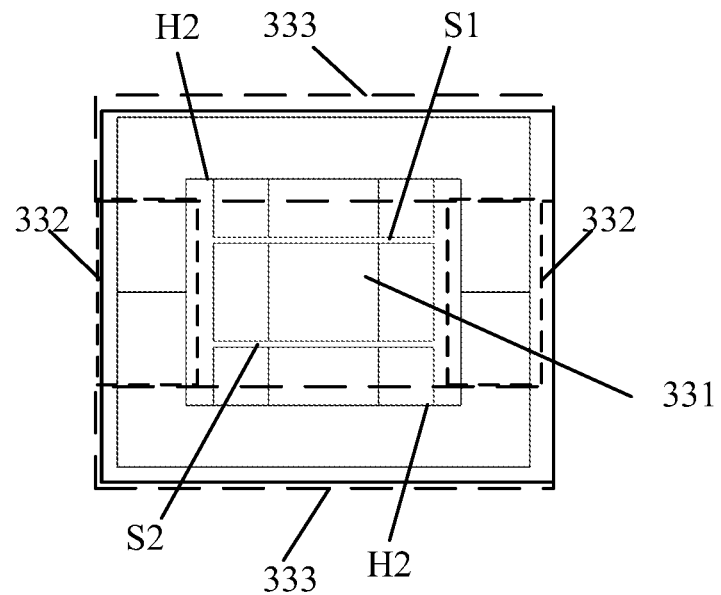
Figure 2D:
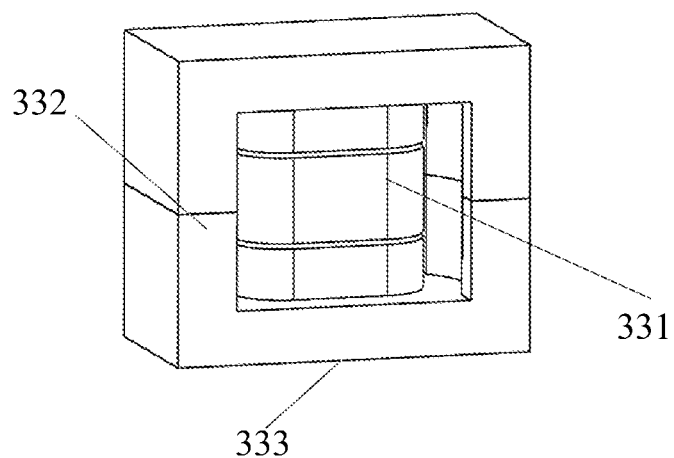
Figure 2E:
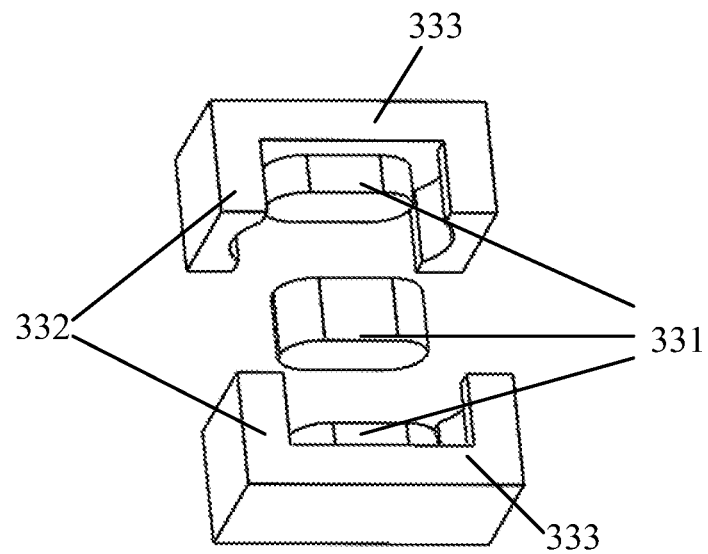

FIG. 2a is a schematic structural diagram of a transformer provided by an embodiment of the present application, FIG. 2b is a perspective view of the structure of the transformer in FIG. 2a, FIG. 2c is a front view of the magnetic core of the transformer in FIG. 2a, FIG. 2d is a perspective view of the magnetic core of the transformer in FIG. 2a, and FIG. 2e is an exploded view of the magnetic core of the transformer in FIG. 2a. As shown in FIG. 2a-FIG. 2b, the transformer includes a first side winding 310, a second side winding 320 and a magnetic core 330. It should be noted that in addition to the first side winding 310, the second side winding 320, and the magnetic core 330 shown in FIG. 2a-FIG. 2b, the transformer may also include a winding bobbin, some clips, and other components, which is not limited in this application.

As shown in FIG. 2c-FIG. 2e, the magnetic core 330 includes a winding column 331, at least one side column 332, and two connecting portions 333. Two ends of the winding column 331 are respectively connected to at least one side column 332 through the two connecting portions 333. In this embodiment, the side column 332 is two in number, and they are respectively located at the left and right ends of the two connecting portions 333, the winding column 331 is located between the two side columns 332, and the entire magnetic core 330 is shaped like a character of "日". However, in other embodiments, the side column 331 may be one in number, and the entire magnetic core 330 is then shaped like a character of "山".

As shown in FIG. 2a and FIG. 2b, the first side winding 310 includes: a first side first winding 311 and a first side second winding 312 that are electrically connected, the second side winding 320 is located between the first side first winding 311 and the first side second winding 312, and the second side winding 320 and the first side first winding 311 are spaced apart by a first preset distance L1 along the axial direction of the winding column 331, the second side winding 320 and the first side second winding 312 are spaced apart by a second preset distance L2 along the axial direction of the winding column 331, the first side first winding 311, the first side second winding 312 and the second side winding 320 are all wound around the winding column 331. In this embodiment, the first side first winding 311 and the first side second winding 312 may be connected in series or in parallel.

The winding column 331 is provided with a first air gap S1, where the first air gap S1 is provided between the second side winding 320 and the first end surface H1 of the winding column 331.

For the transformer shown in FIG. 2a and FIG. 2b, the first side first winding 311, the second side winding 320 and the first side second winding 312 are sequentially wound around the winding column 331 along the axial direction of the winding column 331, where the first side first winding 311 and the second side winding 320 are spaced apart by a first preset distance L1, the second side winding 320 and the first side second winding 312 are spaced apart by a second preset distance L2, the first preset distance and the second preset distance may be equal or not equal. When the first preset distance L1 and the second preset distance L2 are equal, the first side first winding 311 and the first side second winding 312 are symmetrically distributed with respect to the second side winding 320.

A first air gap S1 is provided on the winding column 331, and the first air gap S1 is provided between the second side winding 320 and the first end surface H1 of the winding column 331. The first end surface H1 of the winding column 331 is a surface connecting the winding column 331 and one of the two connecting portions 333.

For example, as shown in FIG. 2a and FIG. 2b, d is a distance between the first air gap S1 and the middle position of the second side winding 320, and D1 is a distance between the upper edge of the second side winding 320 and the middle position of the second side winding 320. D2 is a distance between the lower edge of the first side first winding 311 and the middle position of the second side winding 320, and D3 is a distance between the first end surface H1 of the winding column 331 and the middle position of the second side winding 320, then the position of the first air gap S1 satisfies D1<d<D3.

In the transformer shown in FIG. 2a and FIG. 2b, by providing the first air gap S1 between the second side winding 320 and the first end face H1 of the winding column 331, the first side equivalent leakage inductance and the second side equivalent leakage inductance can be obtained, and the first side equivalent leakage inductance and the second side equivalent leakage inductance are used to realize the first side resonant inductor and the second side resonant inductor of the bidirectional isolated resonant converter. And there is no need to additionally provide windings of a first side resonant inductor and a second side resonant inductor, that is, the full integration of the first side resonant inductor, the second side resonant inductor, the parallel resonant inductor and the transformer is realized, thereby reducing the overall volume and loss of the magnetic elements, thereby also reducing the volume and loss of the bidirectional isolated resonant converter.

Moreover, on the winding column 331, adjusting the position of the first air gap S1 can adjust the magnitude of the first side equivalent leakage inductance and the second side equivalent leakage inductance. Thus, the magnitude of the first side resonant inductor and the second side resonant inductor are adjusted to meet the requirements for the first side resonant inductor and the second side resonant inductor.

In some possible embodiments, with continued reference to FIG. 2a and FIG. 2b, a second air gap S2 is also provided on the winding column 331, where the second air gap S2 is located between the second side winding 320 and the second end surface H2 of the winding column 331. As shown in FIG. 2c-FIG. 2e, the second end surface H2 is a surface connecting the winding column 331 and the other one of the two connecting portions 333. On the winding column 331, the second end surface H2 and the first end surface H1 are provided opposite to each other.

Figure 3:
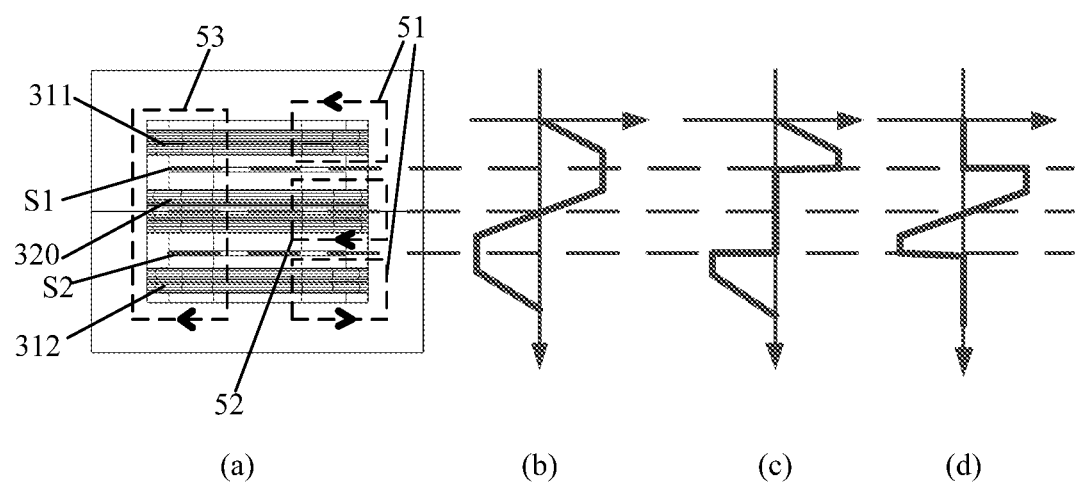
FIG. 3 is a schematic diagram of leakage magnetic flux distribution provided by an embodiment of the present application.

FIG. 3 is a schematic diagram of the leakage magnetic flux distribution provided by an embodiment of the present application, in which (a) in FIG. 3 shows the distribution of the leakage magnetic flux; (b) in FIG. 3 is the magnetic field intensity generated by the first side current flowing through the first side winding 310 and the second side current flowing through the second side winding 320, the magnetic field energy thereof corresponds to the sum of the first side equivalent leakage inductance and the second side equivalent leakage inductance; (c) in FIG. 3 is the magnetic field intensity generated by the first side current flowing through the first side winding 310, and the magnetic field energy thereof corresponds to the magnitude of the first side equivalent leakage inductance; (d) in FIG. 3 is the magnetic field intensity generated by the second side current flowing through the second side winding 320, and the magnetic field energy thereof corresponds to the magnitude of the second side equivalent leakage inductance.

As shown in (a) of FIG. 3, 51 is the leakage magnetic flux of the first side winding 310, 52 is the leakage magnetic flux of the second side winding 320, 53 is the mutual magnetic flux between the first side winding 310 and the second side winding 320, where the arrow direction indicates the direction of the magnetic flux.

It can be seen from FIG. 3 that the first air gap S1 is provided between the second side winding 320 on the winding column 331 and the first end surface H1 of the winding column 331, and the second air gap S2 is provided between the second side winding 320 and the second end surface H2 of the winding column 331, so that the distribution of the first side leakage flux and the second side leakage flux can be more balanced, which is beneficial to the reduction of the magnetic core loss.

In order to make the distribution of the first side leakage flux and the second side leakage flux more balanced, in some embodiments, on the winding column 331, the second air gap S2 may be provided between the second side winding 320 and the first side second winding 312, and the first air gap S1 and the second air gap S2 are symmetrically distributed with respect to the second side winding 320.

It should be noted that when only one air gap is provided on the winding column 331, that is, only the first air gap S1 is provided, the first air gap S1 may also be provided between the second side winding 320 and the second end surface H2 of the winding column 331.

Figure 4:
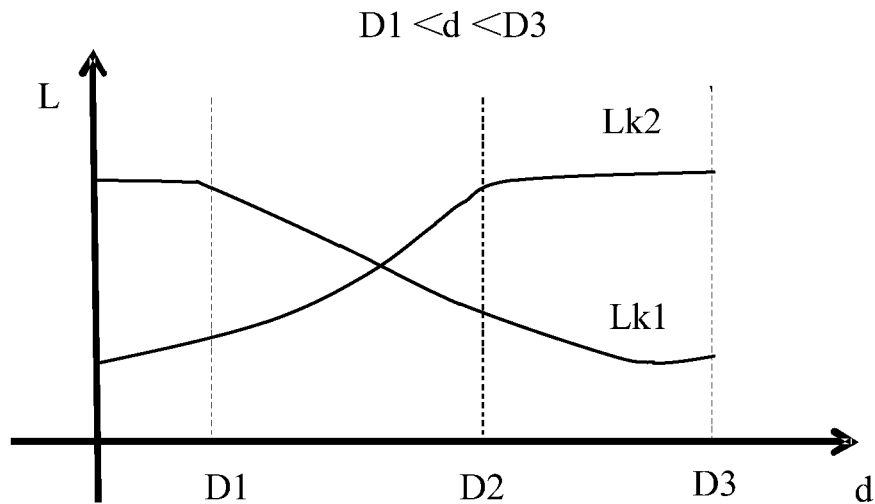
FIG. 4 is a diagram of the relationship between the position of the first air gap and the first side equivalent leakage inductance and between the position of the first air gap and the second side equivalent leakage inductance according to an embodiment of the present application.

FIG. 4 is a diagram of the relationship between the position of the first air gap and the first side equivalent leakage inductance and between the position of the first air gap and the second side equivalent leakage inductance according to an embodiment of the present application. As shown in FIG. 4, when the first air gap S1 moves from the middle position of the second side winding 320 to the first end surface H1, the leakage magnetic flux 51 formed by the first side current in the first side winding 310 will decrease, that is, the first side equivalent leakage inductance $L_{k1}$ will decrease; the leakage magnetic flux 52 formed by the second side current in the second side winding 320 will increase, that is, the second side equivalent leakage inductance $L_{k2}$ will increase.

Moreover, it can be seen from FIG. 4 that when 0<d<D1, the position of the first air gap S1 has a certain adjustment effect on the second side equivalent leakage inductance $L_{k2}$, however, the adjustment effect on the first side equivalent leakage inductance $L_{k1}$ is limited. When D2<d<D3, the position of the first air gap S1 has a certain adjustment effect on the first side equivalent leakage inductance $L_{k1}$, however, the adjustment effect on the second side equivalent leakage inductance $L_{k2}$ is limited.

Therefore, in some embodiments, the first air gap S1 has a position of D1<d<D2, that is, it is provided between the upper edge of the second side winding 320 and the lower edge of the first side first winding 311. At this time, both the relationship between the position of the first air gap S1 and the first side equivalent leakage inductance $L_{k1}$ and the relationship between the position of the first air gap S1 and the second side equivalent leakage inductance $L_{k2}$ are highly sensitive, and it is easier to adjust the first side equivalent leakage inductance $L_{k1}$ and the second side equivalent leakage inductance $L_{k2}$, and it is easier for the first side equivalent leakage inductance $L_{k1}$ and the second side equivalent leakage inductance $L_{k2}$ to balance, which makes it easier to balance the first side resonant inductor and the second side resonant inductor that are obtained after equivalence so as to meet the application demand.

Next, the equivalent leakage inductance generated when the first air gap S1 is provided between the upper edge of the second side winding 320 and the lower edge of the first side first winding 311 in the embodiment of the present application is compared with the equivalent leakage inductance generated when the air gap in the related technology is provided in the middle position of the second side winding 320.

The number of turns of the first side winding 310 is N1=8 turns, wherein the number of turns of the first side first winding 311 is 4 turns, the number of turns of the first side second winding 312 is 4 turns, the first side first winding 311 and the first side second winding 312 are connected in series, the number of turns of the second side winding 320 is N2=6 turns, and the turns ratio is n=N2/N1=6/8. D1=4.0 mm, D2=10 mm, d=7.0 mm.

Figure 5A:
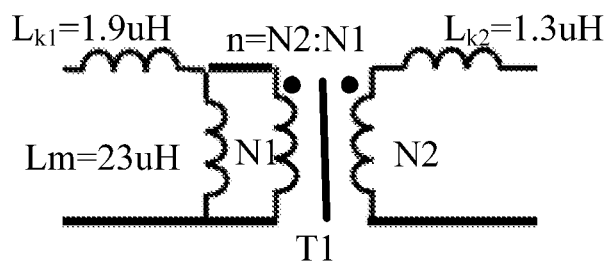
FIG. 5a is a schematic diagram of an equivalent circuit of a transformer provided by an embodiment of the present application, showing the inductance of the first side equivalent leakage inductance and the second side equivalent leakage inductance.

As shown in FIG. 5a, when the first air gap S1 is provided between the upper edge of the second side winding 320 and the lower edge of the first side first winding 311, the first side equivalent leakage inductance $L_{k1}$=1.9 uH, the second side equivalent leakage inductance $L_{k2}$=1.2 uH, and the magnetizing inductance Lm=23uH. That is, the first side resonant inductor Lr1=1.9 uH, the second side resonant inductor Lr2=1.3 uH, and the parallel resonant inductor Lm=23 uH.

Figure 5B:
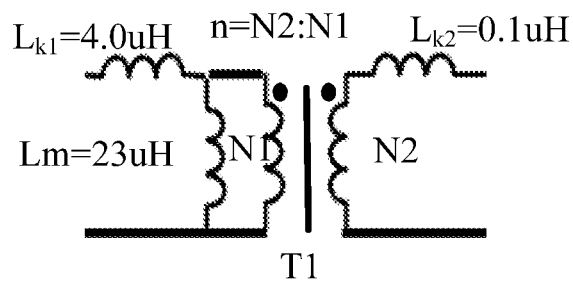
FIG. 5b is a schematic diagram of an equivalent circuit of a transformer provided according to the related art, showing the inductance of the first side equivalent leakage inductance and the second side equivalent leakage inductance.

As a comparison with the related technology, a synchronous comparison is made to the leakage inductance distribution when the air gap is provided in the middle position of the second side winding 320, i.e. d=0. As shown in FIG. 5b, the first side equivalent leakage inductance $L_{k1}$=4.0 uH, the second side equivalent leakage inductance $L_{k2}$=0.1 uH, and the magnetizing inductance Lm=23 uH. At this time, the first side equivalent leakage inductance is too large, and the second side equivalent leakage inductance is too small.

Figure 1A:
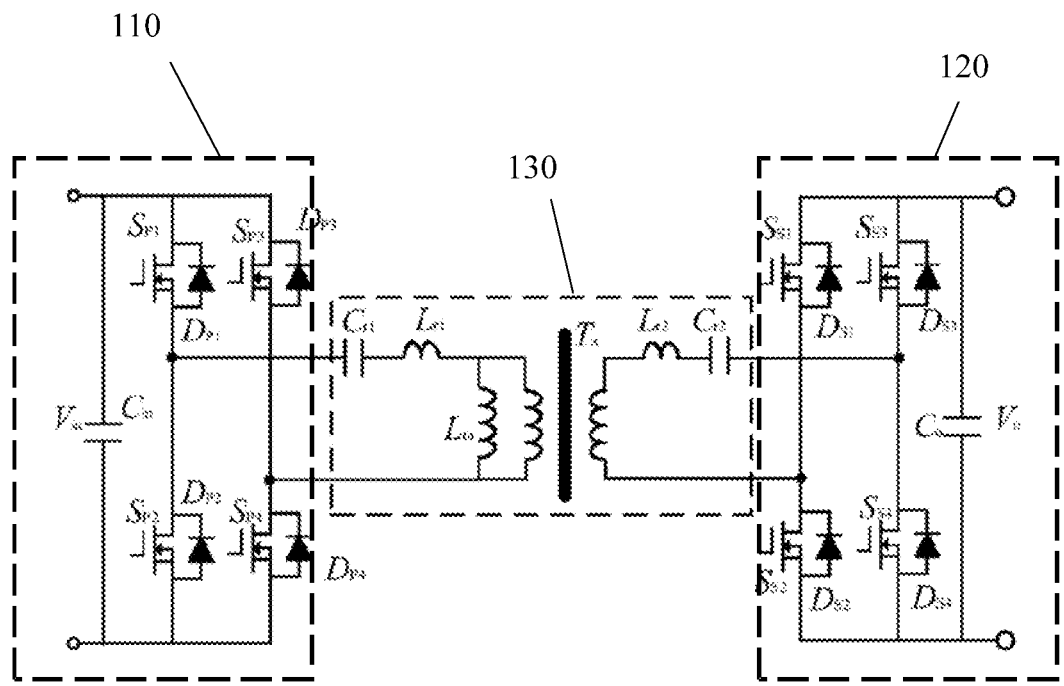
FIG. 1a is a schematic circuit diagram of a bidirectional isolated resonant converter.
Figure 1B:
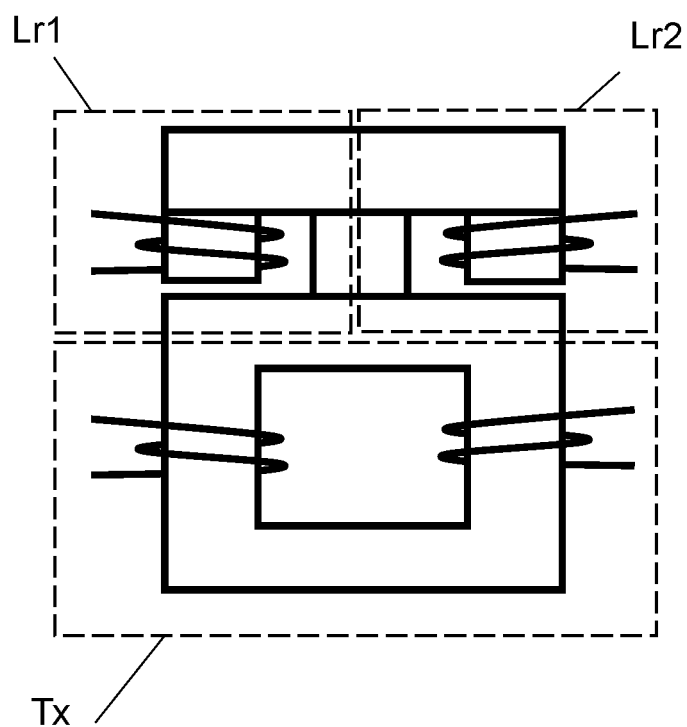
FIG. 1b is a magnetic integration scheme of a transformer and resonant inductors.

In the circuit topology of the CLLLC shown in FIG. 1a, the typical requirements for the first side resonant inductor Lr1 and the second side resonant inductor Lr2 are Lr1≥5%*Lm, Lr2≥5%*Lm*n². Therefore, in the embodiment of the present application, the equivalent leakage inductance can meet the application requirements of CLLLC; but in the related art, when the air gap is provided in the middle position of the second side winding 320, that is, d=0, the application requirements for the first side resonant inductor Lr1 and the second side resonant inductor Lr2 cannot be met.

Figure 6A:
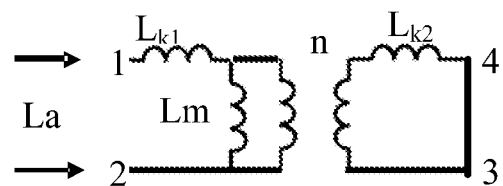
FIG. 6a-FIG. 6c are schematic diagrams of circuits for obtaining inductance parameters according to an embodiment of the present application.
Figure 6B:
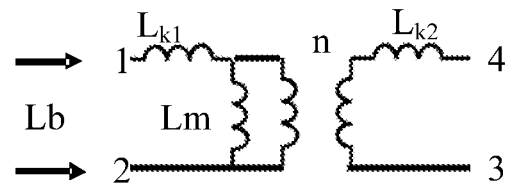
Figure 6C:
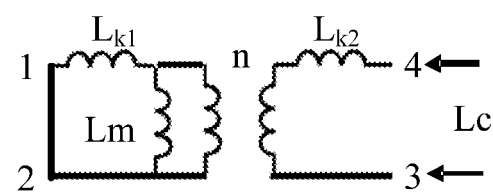

Hereinafter, with reference to FIG. 6a-FIG. 6c, the method for obtaining the first side equivalent leakage inductance $L_{k1}$, the second side equivalent leakage inductance $L_{k2}$, and the magnetizing inductance Lm will be described:

First, as shown in the equivalent circuit in FIG. 6a, the second side winding 320 is short circuited to obtain the inductance of the first side winding 310, denoted as La. Then, as shown in FIG. 6b, the second side winding 320 is opened to obtain the inductance of the first side winding 310, denoted as Lb. Finally, as shown in FIG. 6c, the first side winding 310 is short circuited to obtain the inductance of the second side winding 320, denoted as Lc. A set of equations is obtained as:

$$\left.\begin{array}{l} \frac{L_{k2}}{n^2} // L_m + L_{k1} = L_a \\ L_m + L_{k1} = L_b \\ (L_{k1} // L_m) * n^2 + L_{k2} = L_c \end{array}\right\}$$

$L_{k1}$ is the first side equivalent leakage inductance, $L_{k2}$ is the second side equivalent leakage inductance, Lm is the magnetizing inductance, and the symbol "//" means "parallel connection". Solve the above set of equations to obtain:

$$L_m = \sqrt{\frac{(L_b - L_a) * L_b * L_c}{n^2 * L_a}}$$

$$L_{k1} = L_b - L_m$$

$$L_{k2} = L_c - \frac{n^2 * L_{k1} * L_m}{L_{k1} + L_m}$$

Figure 7A:
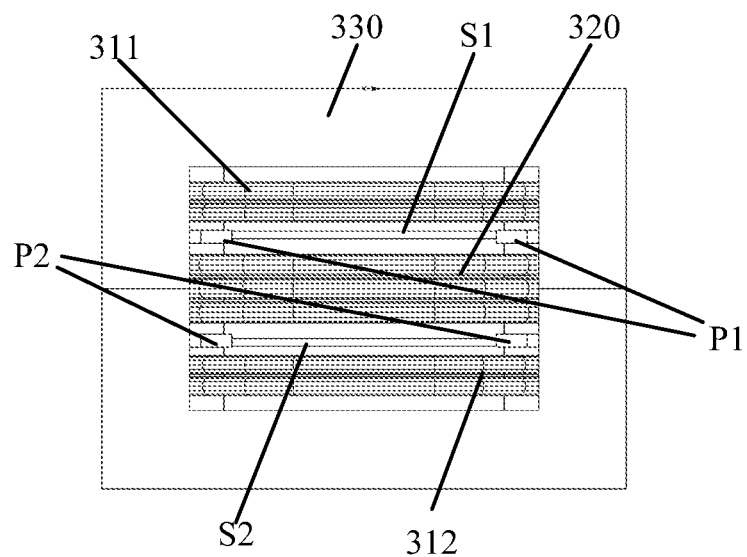
FIG. 7a is a schematic structural diagram of a transformer provided by an embodiment of the present application.
Figure 7B:
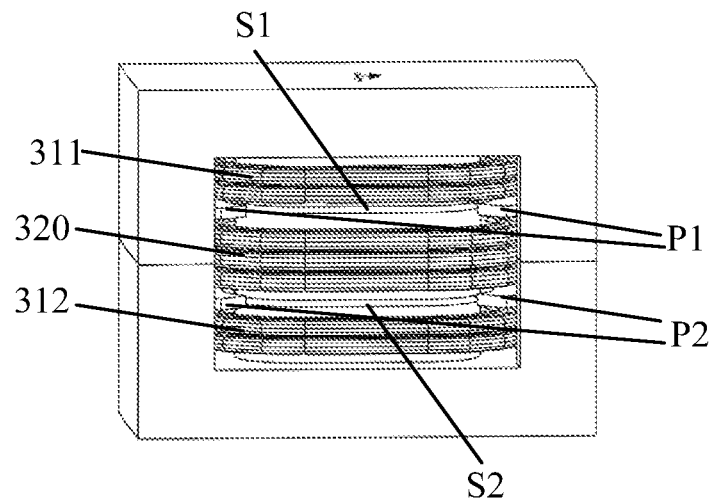
Figure 7C:
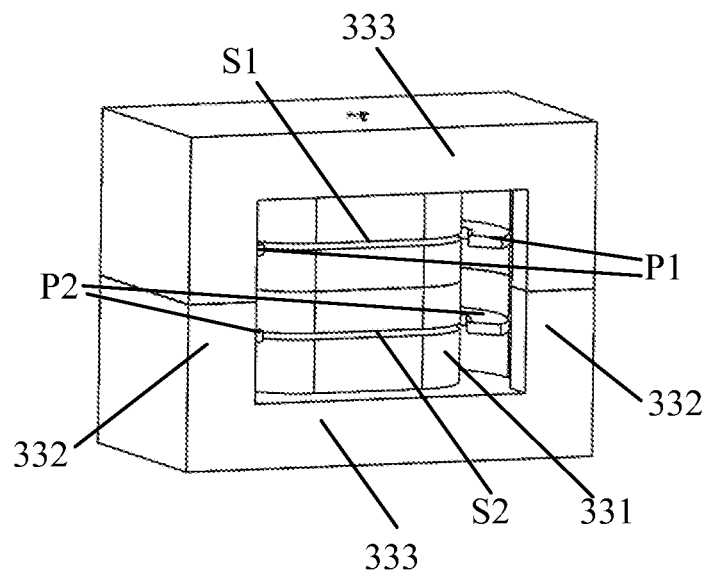
Figure 7D:
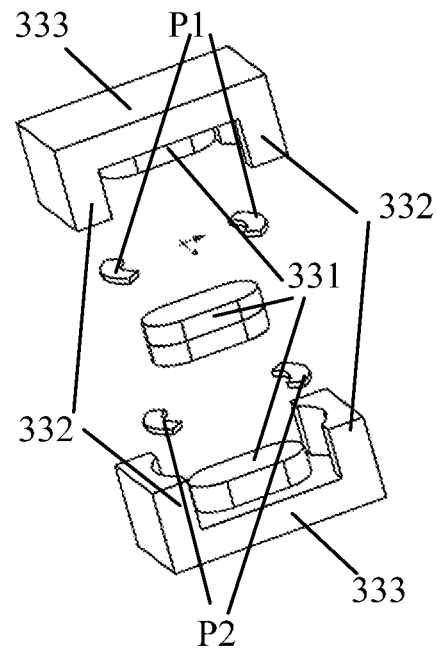

In order to increase the leakage inductance of the transformer, it is usually necessary to increase the first preset distance L1 between the first side first winding 311 and the second side winding 320, and the second preset distance L2 between the second side winding 320 and the first side second winding 312, which will increase the volume of the transformer. Therefore, in order to further reduce the volume of the transformer, the present application proposes to provide an auxiliary magnet on the transformer on the basis of any of the above embodiments. Exemplarily, FIG. 7a is a schematic structural diagram of a transformer provided by an embodiment of the present application, FIG. 7b is a perspective view of the structure of the transformer in FIG. 7a, FIG. 7c is a perspective view of a magnetic core of the transformer in FIG. 7a, FIG. 7d is an exploded view of the magnetic core of the transformer in FIG. 7a. As shown in FIG. 7a-FIG. 7d, the transformer further includes: a first auxiliary magnet P1 and a second auxiliary magnet P2.

As shown in FIG. 7a-FIG. 7d, the first auxiliary magnet P1 is provided between the first side first winding 311 and the second side winding 320, and the second auxiliary magnet P2 is provided between the first side second winding 312 and the second side winding 320.

For the transformer shown in FIG. 7a-FIG. 7b, the first auxiliary magnet P1 is taken as an example for description. The first auxiliary magnet P1 is provided between the first side first winding 311 and the second side winding 320. Since the first auxiliary magnet P1 is a magnetic core material, the first side leakage flux can be increased, so that a large leakage inductance can be maintained without increasing the distance between the first side first winding 311 and the second side winding 320. Therefore, while the same leakage inductance is maintained, the distance between the first side first winding 311 and the second side winding 320 can be reduced; similarly, the second auxiliary magnet P2 can reduce the distance between the first side second winding 312 and the second side winding 320, thereby reducing the volume of the transformer.

In some embodiments, with continued reference to FIG. 7c and FIG. 7d, the first auxiliary magnet P1 and the second auxiliary magnet P2 are both magnet pieces with two ends in arc-shape. The magnetic core and the auxiliary magnet may both be ferrite materials.

In some embodiments, with continued reference to FIG. 7a-FIG. 7c, the first auxiliary magnet P1 and the second auxiliary magnet P2 are symmetrically distributed with respect to the second side winding 320.

In some embodiments, with continued reference to FIG. 7d, the first auxiliary magnet P1 and the second auxiliary magnet P2 are both discrete components, and the first auxiliary magnet P1 and the second auxiliary magnet P2 are fixed in a cavity of a winding bobbin. The use of discrete components can simplify the complexity of each magnetic core and reduce the difficulty of molding tool. In other embodiments, there may be other choices for the shape, number, and material of the auxiliary magnet.

Figure 8A:
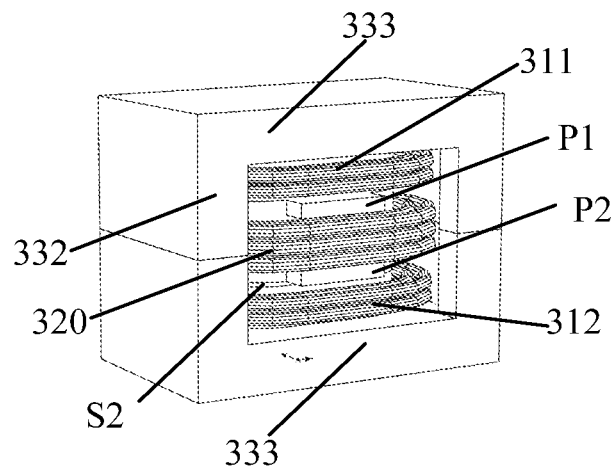
FIG. 8a is a perspective view of a structure of a transformer provided by an embodiment of this application.
Figure 8B:
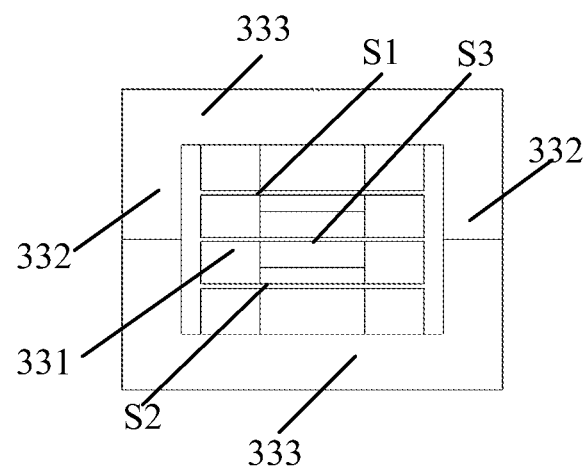
Figure 8C:
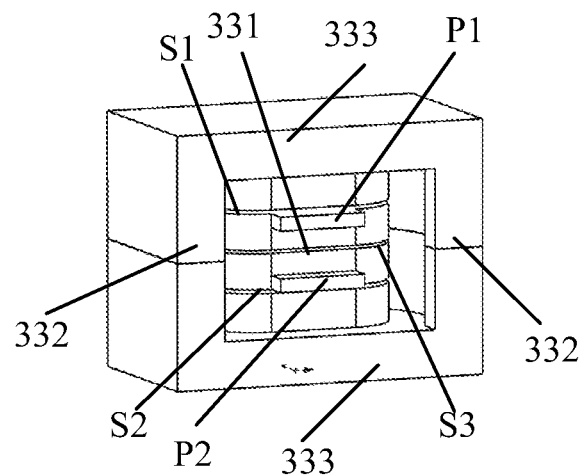
Figure 8D:
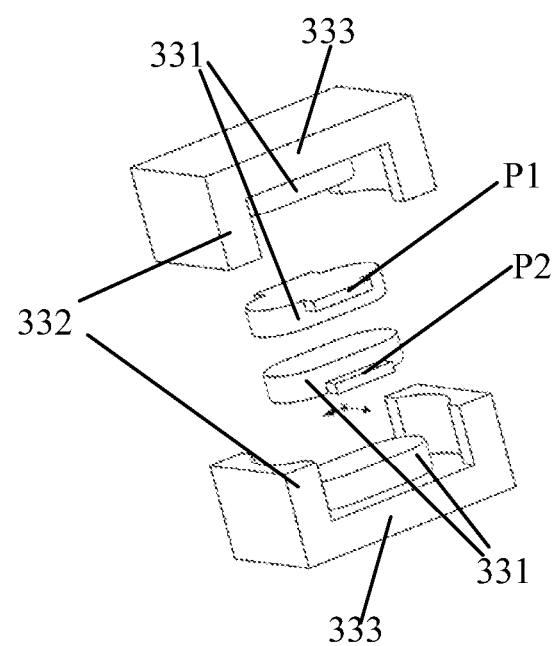

FIG. 8a is a perspective view of a structure of a transformer provided by an embodiment of the present application, FIG. 8b is a front view of the magnetic core of the transformer in FIG. 8a, FIG. 8c is a perspective view of the magnetic core of the transformer in FIG. 8a, FIG. 8d is an exploded view of the magnetic core of the transformer in FIG. 8a.

In some embodiments, as shown in FIG. 8a-FIG. 8d, the first auxiliary magnet P1 and the second auxiliary magnet P2 are both provided between the first air gap S1 and the second air gap S2. This embodiment may be suitable for an application scenario where the second side equivalent leakage inductance needs to be larger and the first side equivalent leakage inductance needs to be smaller.

As shown in FIG. 8b and FIG. 8c, a third air gap S3 is provided on the winding column 331, and the third air gap S3 is located between the first auxiliary magnet P1 and the second auxiliary magnet P2. In this embodiment, the provision of the third air gap S3 can increase the reluctance of the leakage flux path of the second side winding 320, thereby reducing the equivalent leakage inductance of the second side, and playing the role of more flexible adjustment and control of leakage inductance.

In some embodiments, as shown in FIG. 8b and FIG. 8c, the third air gap S3 is located in the middle position of the second side winding 320.

In some embodiments, as shown in FIG. 8d, the first auxiliary magnet P1 and the second auxiliary magnet P2 are integrally formed with at least part of the winding column 331, respectively. In this way, the positions of the first auxiliary magnet P1 and the second auxiliary magnet P2 respect to the magnetic core 330 can be better controlled, and the number of magnetic core components can be reduced, and the complexity of the manufacturing process of the transformer can be simplified.

Based on the technical concept of the present application, an embodiment of the present application also provides a bidirectional isolated resonant converter. As shown in FIG. 1a, the bidirectional isolated resonant converter includes: a first side circuit 110, a second side circuit 120, and a resonant tank 130. The resonant tank 130 is electrically coupled between the first side circuit 110 and the second side circuit 120. The resonant tank 120 includes a first side resonant capacitor Cr1, a second side resonant capacitor Cr2, and the transformer described in any of the above embodiments. The transformer is electrically connected to the first side resonant capacitor Cr1 and the second side resonant capacitor Cr2.

Through application of the transformer in the above embodiment to the bidirectional isolated resonant converter in FIG. 1a, the control of the position at which the air gap is provided in the transformer is used to obtain the first side equivalent leakage inductance and the second side equivalent leakage inductance, the first side equivalent leakage inductance and the second side equivalent leakage inductance are used to realize the first side resonant inductor and the second side resonant inductor of the bidirectional isolated resonant converter. There is no need to additionally provide a first side resonant inductor and a second side resonant inductor, that is, the full integration of the first side resonant inductor, the second side resonant inductor, the parallel resonant inductor and the transformer is realized, thereby reducing the overall volume and loss of the magnetic elements, thereby also reducing the volume and loss of the bidirectional isolated resonant converter.

The terms "first", "second", "third", "fourth", etc. (if any) in the specification and claims of the present application and the above-mentioned drawings are used to distinguish similar objects, but are not used to describe a specific order or sequence.

In addition, it should be noted that in the present disclosure, unless otherwise clearly defined and limited, the terms "connected", "coupled", etc. should be understood in a broad sense, for example, they may indicate a mechanical connection, an electrical connection, a direct connection, an indirect connection through an intermediate medium, an internal communication between two elements or an interaction between two elements. Unless otherwise clearly defined, for those of ordinary skill in the art, the specific meanings of the above terms in the present disclosure can be understood according to specific situations.

Finally, it should be noted that the above embodiments are only used to illustrate, rather than limiting, the technical solutions of the present application; although the present application has been described in detail with reference to the foregoing embodiments, those of ordinary skill in the art should understand: it is still possible to modify the technical solutions recorded in the foregoing embodiments, or equivalently replace some or all of the technical features; however, these modifications or replacements do not cause the essence of the corresponding technical solutions to deviate from the scope of the technical solutions in the embodiments of the present application.

What is claimed is:

1. A transformer, comprising: a first side winding, a second side winding and a magnetic core; wherein the magnetic core comprises: a winding column, at least one side column and two connecting portions;

two ends of the winding column are respectively connected to the at least one side column through the two connecting portions;

the first side winding comprises: a first side first winding and a first side second winding that are electrically connected;

the second side winding is located between the first side first winding and the first side second winding, and the second side winding and the first side first winding are spaced apart by a first preset distance along an axial direction of the winding column, and the second side winding and the first side second winding are spaced apart by a second preset distance along an axial direction of the winding column, the first side first winding, the first side second winding and the second side winding are all wound around the winding column;

a first air gap is provided on the winding column, wherein the first air gap is provided between the second side winding and a first end surface of the winding column.

2. The transformer according to claim 1, wherein the first air gap is used to obtain a first side equivalent leakage inductance and a second side equivalent leakage inductance, and the first side equivalent leakage inductance and the second side equivalent leakage inductance are used to realize a first side resonant inductor and a second side resonant inductor of a bidirectional isolated resonant converter.

3. The transformer according to claim 1, wherein the first air gap is provided between the second side winding and the first side first winding.

4. The transformer according to claim 1, wherein a second air gap is further provided on the winding column, and the second air gap is provided between the second side winding and a second end surface of the winding column, wherein the second end surface of the winding column is provided opposite to the first end surface.

5. The transformer according to claim 4, wherein the second air gap is provided between the second side winding and the first side second winding.

6. The transformer according to claim 4, wherein the first side first winding and the first side second winding are symmetrically distributed with respect to the second side winding, and the first air gap and the second air gap are symmetrically distributed with respect to the second side winding.

7. The transformer according to claim 4, further comprising: a first auxiliary magnet and a second auxiliary magnet;

the first auxiliary magnet is provided between the first side first winding and the second side winding, and the second auxiliary magnet is provided between the first side second winding and the second side winding.

8. The transformer according to claim 7, wherein the first auxiliary magnet and the second auxiliary magnet are both provided between the first air gap and the second air gap.

9. The transformer according to claim 7, wherein the first auxiliary magnet and the second auxiliary magnet are both magnet pieces with two ends in arc-shape.

10. The transformer according to claim 7, wherein the first auxiliary magnet and the second auxiliary magnet are symmetrically distributed with respect to the second side winding.

11. The transformer according to claim 7, wherein the first auxiliary magnet and the second auxiliary magnet are both discrete components, and the first auxiliary magnet and the second auxiliary magnet are fixed in a cavity of a winding bobbin.

12. The transformer according to claim 7, wherein the first auxiliary magnet and the second auxiliary magnet are integrally formed with at least part of the winding column, respectively.

13. The transformer according to claim 7, wherein a third air gap is provided on the winding column, and the third air gap is located between the first auxiliary magnet and the second auxiliary magnet.

14. The transformer according to claim 1, wherein the at least one side column comprises two side columns, and the winding column is located between the two side columns.

15. A bidirectional isolated resonant converter, comprising: a first side circuit, a second side circuit, and a resonant tank, wherein the resonant tank is electrically coupled between the first side circuit and the second side circuit;

the resonant tank comprises a first side resonant capacitor, a second side resonant capacitor and the transformer according to claim 1;

the transformer is electrically connected to the first side resonant capacitor and the second side resonant capacitor.

* * * * *